United States Patent  [15] 3,700,123
Corley, Jr.  [45] Oct. 24, 1972

[54] POWER LIFT AND GATE APPARATUS FOR TRUCK

[72] Inventor: Quentin D. Corley, Jr., 326 South Rock Island, Dallas, Tex. 75207

[22] Filed: Aug. 16, 1971

[21] Appl. No.: 171,949

[52] U.S. Cl. .......................... 214/77 P, 214/DIG. 10
[51] Int. Cl. ............................................. B60p 1/48
[58] Field of Search...214/77 R, 77 P, 75 T, DIG. 10, 214/130, 131

[56] References Cited

UNITED STATES PATENTS

| | | | |
|---|---|---|---|
| 2,683,540 | 7/1954 | Wood | 214/77 P |
| 3,498,481 | 3/1970 | Size | 214/77 P |
| 3,305,112 | 2/1967 | Brown | 214/77 P |
| 3,528,574 | 9/1970 | Denner et al. | 214/77 P |

Primary Examiner—Gerald M. Forlenza
Assistant Examiner—Robert J. Spar
Attorney—Cecil L. Wood et al.

[57] ABSTRACT

A lift frame for attachment to the truck frame and bed includes a tubular horizontal base having integral transverse brackets for attachment to the truck frame and having upright end posts securely welded to the tubular member. A mounting flange welded along the tubular member is secured along the edge of the truck bed. A hinged lift platform includes a horizontal portion and a folding portion, with the horizontal portion swingably supported by a parallelogram arms on the frame end posts. A torque bar connects lift arms, defining one of the parallel arms at each end; and a hydraulic power cylinder connects one lift arm and one corner post to swing the lift platform between the upper position in the plane of the truck bed and the lower ground position. In the upper limit position, the torque bar is stressed by the power cylinder so that the folding portion may be swung into upright position to define a gate, with co-acting latch mains of the gate and one end post positioned for latching engagement. When the power cylinder is released, the torque bar positively latches the gate in locked position.

12 Claims, 12 Drawing Figures

INVENTOR
Quentin D. Corley, Jr.

INVENTOR
Quentin D. Corley, Jr.

BY

ATTORNEYS

Fig.6  Fig.8  Fig.9  Fig.10  Fig.11  Fig.12

INVENTOR
Quentin D. Corley, Jr.
BY
ATTORNEYS

POWER LIFT AND GATE APPARATUS FOR TRUCK

BACKGROUND AND SUMMARY OF THE INVENTION

This invention relates to apparatus adapted to be mounted on a vehicle such as a pick-up truck and which functions as a combination lift and gate closure.

Many forms of hydraulic lifting devices have been developed for use with all forms of trucks for the purpose of raising and lowering loads between the truck bed and ground level. The features of such devices are necessarily adapted to the types of vehicles with which they are used; and more expensive and larger capacity lifts may be desired and economically feasible for use with a large capacity trucks or trailers, for example. Where such apparatus is desired for use with relatively small capacity vehicles such as pick-up trucks, it is necessary that the apparatus be designed economically with a view to the intended use.

Where such apparatus is not appropriately designed for mounting in relatively small capacity trucks, such as one-half ton or three-quarter ton pick-up trucks, the torque imposed by a fully loaded lift apparatus may distort the frame or body members of the truck.

A primary object of this invention is to provide lifting apparatus for a relatively low capacity vehicle such as a pick-up truck, which is simple in construction, relatively easy to mount on the vehicle, which is rugged and durable, and which has adequate load supporting capacity and surface for maximum utility.

Another object of this invention is to provide apparatus of this type for use with a pick-up truck which has a relatively deep lifting platform and yet which provides a low silhouette in the gate enclosure position.

Another object of this invention is to provide apparatus of this type including a novel positive acting gate latching mechanism.

A further object of this invention is to provide apparatus of this type adapted for use with a pick-up type truck which provides for a relatively deep lift platform surface without loss of a load carrying surface of the truck bed.

A still further object of this invention is to provide apparatus of this type which is particularly adapted for use with either wide side or narrow side pick-up type trucks.

Still another object of this invention is to provide apparatus of this type for use with a pick-up truck including a single power cylinder, which is capable of mounting on the pick-up truck without interference with rear brake light and operating plate mount areas, with minimum interference with an underbed mounted spare tire, and which is a neat appearing apparatus.

These objects are accomplished in a lift and gate mechanism for use with a vehicle having a load carrying bed supported on a frame, the mechanism comprising a unitary frame including a horizontal base having means for attachment to the vehicle frame and upright end posts securely fixed to the horizontal base. The horizontal base may include a mounting flange for attachment to the vehicle bed. A hinged lift platform includes a horizontal portion and an upwardly foldable portion to define the gate, with the horizontal portion being swingably connected to the end posts by parallelogram arms at each end including spaced lift arms connected by a torsion bar. A single power cylinder connected between one end post and its associated lift arm swings the lift platform between upper and lower positions.

The novel features and the advantages of the invention, as well as additional objects thereof, will be understood more fully from the following description when read in connection with the accompanying drawings.

DESCRIPTION OF THE PREFERRED EMBODIMENT

The drawings illustrate a preferred embodiment of a lift and gate apparatus which is particularly adapted for use with a pick-up type truck; and the drawings illustrate fragmentarily certain portions of the rear end of a one-half ton or three-quarter ton pick-up truck, for example, which is commonly known as a "wide side" truck wherein the width of the box is substantially greater than the distance between the rear wheels so that wheel enclosures or fender wells necessarily extend into the box area. This lift and gate apparatus may also be used on "narrow side" truck boxes wherein the boxes are rectangular with the side walls located within the rear wheels. In the case of the narrow side body, the distance between the side walls of the box may be slightly greater than 48 inches, and in the case of a wide side body, the distance between the fender wells may be slightly greater than 48 inches; and accordingly, the lift and gate apparatus is constructed to provide an effective opening of slightly greater than 48 inches with the lift platform having a width of 48 inches to provide sufficient lift platform surface. The overall depth of the platform may be 40 inches including a 4 inch ramp.

Figure 2:
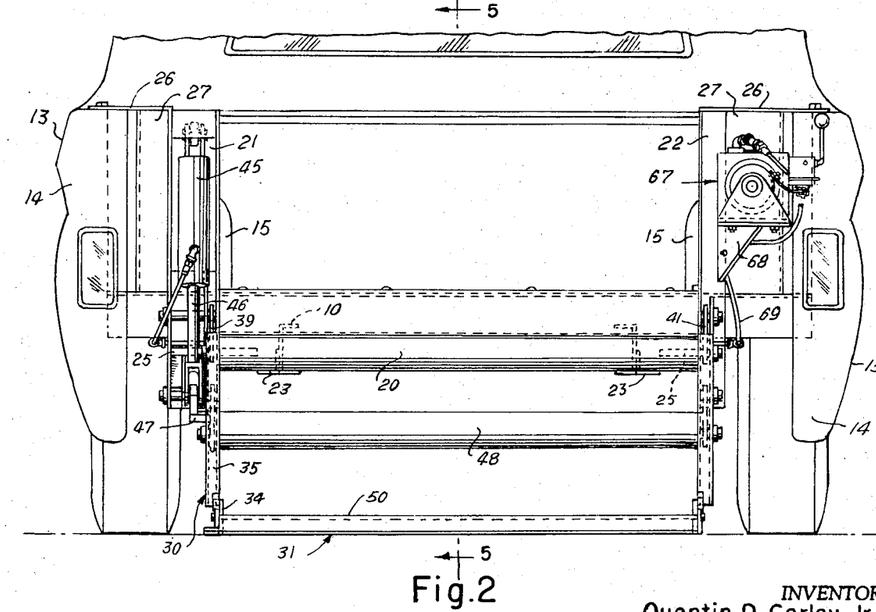
FIG. 2 is a fragmentary rear elevation view of the pick-up truck with the lift apparatus at the ground position.

Referring to the drawings, the portions of the pick-up truck which are of concern relative to the mounting of the lift and gate apparatus are the longitudinal frame channel members 10 which support the bed floor 11 through suitable transverse channel or angle ribs 12. Side walls 13 of the truck body define the inner walls of the truck box and outer sculptered panels. The rearward end walls 14 of the body side walls may provide mountings for rear running and brake lights and for a license plate, for example. Fender wells 15 are seen in FIG. 2.

Figure 5:
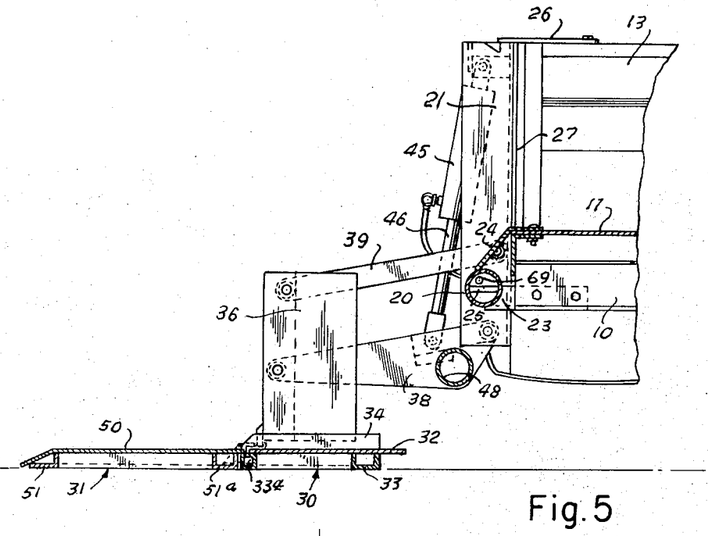
FIG. 5 is a fragmentary sectional view of the rear end of a pick-up truck and lift apparatus at the ground position taken in a vertical longitudinal plane indicated by the line 5—5 in FIG. 2.
Figures 6, 8, 9, 10, 11, 12:
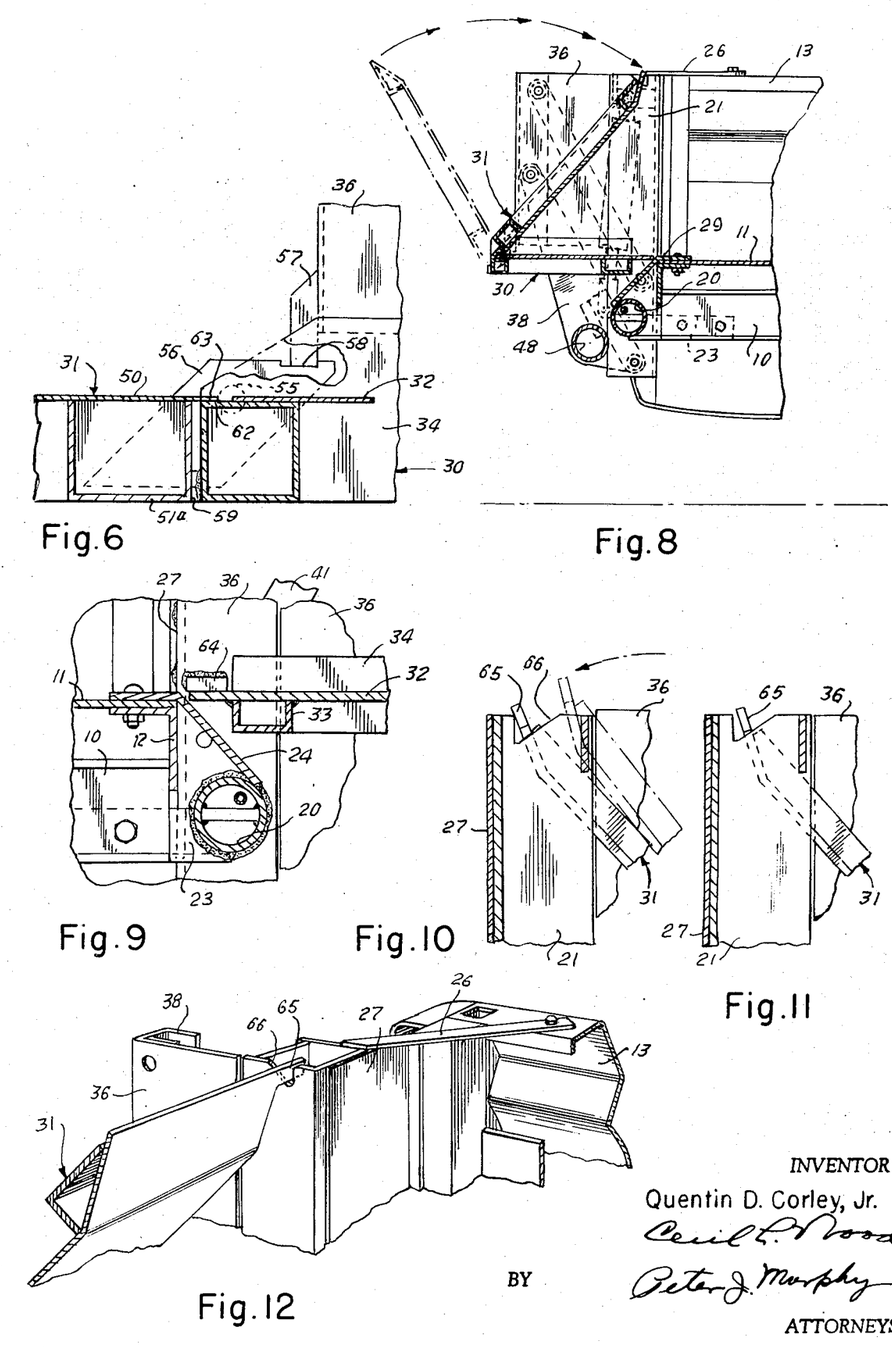
FIG. 6 is a fragmentary detail view illustrating the hinge structure of the horizontal and foldable platform.
FIG. 8 is a fragmentary sectional view of the rear end of a pick-up truck and lift apparatus taken in the same plane as FIG. 5, with the lift apparatus shown in the upper gate closed position and with the gate open position being shown in broken lines.
FIG. 9 is a fragmentary detail sectional view illustrating the stop means for limiting upward movement of the right hand side of the lift platform.
FIGS. 10 and 11 are fragmentary sectional views illustrating the closing and latching of the lift gate.
FIG. 12 is a fragmentary perspective view further illustrating the latching of the lift gate.

The main frame for the lift and gate apparatus, which is secured to the pick-up truck, includes a base member 20 in the form of a metal tube or pipe to which are securely attached, as by welding, left and right upright end posts 21 and 22 respectively. As mounted on the truck, the left end post 21 is a channel member defining side walls and a forward wall; and the right end post 22 is an angle member defining an inner-side wall and a forward wall. When mounted on the rear of the pick-up truck, the frame is disposed so that the horizontal tubular member is generally aligned in a horizontal plane with the truck frame members 10, with the forward walls of the posts 21 and 22 disposed adjacent to or bearing against the rearward edge of the bed floor 11 as best seen in FIGS. 5 and 8. The base tube is rigidly anchored to the frame members 10 by means of brackets 23 which may be in the form of channels and which are welded at their outer ends to the base tube 20 and secured to the frame members by bolting, for example, or by welding.

A further element of this lift and gate frame is a mounting flange 24 which may be an angle member with the walls formed at an obtuse angle, with one wall disposed in a horizontal plane to be bolted to the bed floor 11 and the other wall angled down downwardly and outwardly to be welded along its length to the base tube 20. This mounting flange preferably extends the full distance between the end posts 21 and 22, and is securely welded to the end posts as well as to the base tube to form an integral rigid structure. The rigidity of the structure is further insured by relatively short support plates 25 which are welded within the base tube 20 projecting outwardly therefrom, and extend through suitable slots or notches in the side walls of the respective end posts 21 and 22, with the outer ends of the support plates being securely welded to the respective end posts.

This frame structure, consisting of the base tube 20, the end posts 21 and 22, and the mounting flange 25, has been found to be a strong and adequate frame which, when anchored to the truck frame members 10 and bed floor 11 in the manner described, is sufficiently strong and rigid to support the torque load imposed by the lift and gate apparatus fully loaded.

Figures 3, 4:
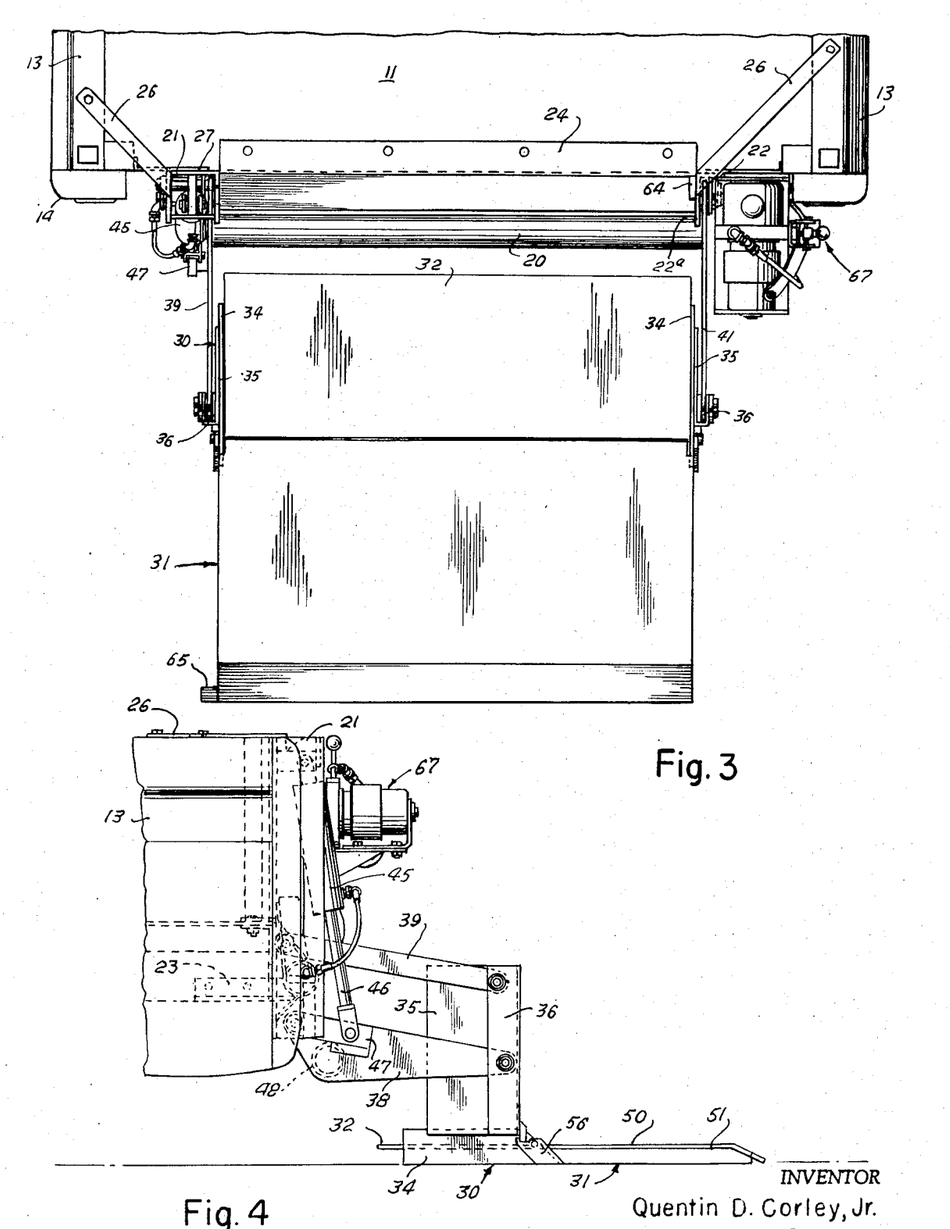
FIG. 3 is a fragmentary plan view of the rear end of a pick-up truck with the lift apparatus at the ground position.
FIG. 4 is a fragmentary left side view of the rear end of a pick-up truck with lift apparatus at the ground position.

As seen in the drawings, the end posts 21 and 22 extend upward to terminate in a plane level with the upper edges of the truck side walls 13; and the lower ends extend somewhat below the level of the truck frame members 10. To anchor the lift frame to the truck side walls, angle straps 26 are provided, being welded at the outer ends to the upper ends of the respective posts 21 and 22, and being secured as by bolting to the upper edges of the side walls 13, as best seen in FIGS. 3 and 12. These straps are not required to anchor the frame, but rather tie the frame and side walls together to thereby prevent spreading of the truck side walls rather than to support the lift frame. Since, in the wide body application illustrated, the lift and gate apparatus is narrower than the width of the box side walls, filler plates 27 are provided to fill the opening in the rear wall of the truck box between the lift apparatus and the side walls 13. As best seen in FIGS. 3 and 12, the inner edges of these filler plates may be skip-welded to the forward walls of the end posts 21 and 22; and the outer edges of the plates, defined by a narrow flange, then butt against the corner posts or other structural parts of the body side walls 13.

In a narrow body application, the end posts would be essentially longitudinally aligned with the body side walls; and in this event the filler plates may be disposed in longitudinal vertical planes, with the edge flanges being welded to the forward walls of the respective end posts, and with the plates lying adjacent to and being bolted or otherwise secured to the truck side walls to tie the side walls and frame structure together.

The lift platform consists of a forward horizontal portion 30, which is maintained in horizontal relation by the support structure to be described, and a rearward foldable gate portion 31 hinged to the horizontal portion through a hinge structure to be described. The horizontal platform 30 is an integral structure including a floor 32 of suitable steel plate, under-floor supporting ribs 33 fabricated of angles, channels, or tubes, for example, and side plates 34. As best seen in FIGS. 4 and 5, the side plates extend upwardly above the surface of the floor, and the floor extends forwardly beyond the forward edges of the side plates.

The horizontal platform structure further includes side walls 35 which are welded, for example, to the exterior surfaces of the side plates 34 and extend upwardly therefrom. The rearward edges of the side walls, which are also fabricated of suitable steel plate, are provided with re-entrant outer flanges 36 for a purpose to be described.

The horizontal platform 30 is swingably mounted on the frame to swing between an upper position wherein the platform floor lies in the plane of the truck bed floor 11, as best seen in FIG. 8, and a lower position wherein the platform rests on the ground surface, as illustrated in FIGS. 1 through 5. This is accomplished by a parallelogram support structure which includes a lower lift arm 38 and upper guide arm 39 defining parallel arms pivotly connected between the lower portion of the left end post 21 and the upper portion of the adjacent horizontal platform side wall 35. A similar lower lift arm 40 and upper parallel guide arm 41 are pivotly connected between the lower end of the end post 22 and the adjacent upper portion of the horizontal platform side wall 35. These support arms lie outside the main portions of the respective platform side walls 35 and are received within the channels defined by the re-entrant flanges 36, with the pivot pins being appropriately anchored in the side walls and re-entrant flanges. At the frame end of the arms 38 and 39, the arms are received within the channel defining the left end post 21 with the pivot pins being suitably supported in the side walls of the end post. On the right side, the forward ends of the support arms 40 and 41 lie outside of the side wall of the end post angle 22.

In the upper position of the horizontal platform 30, the forward edge of the platform floor 32 lies adjacent to and in the plane of the rearward edge of the truck bed floor 11 which is defined by the frame mounting flange 24. The platform floor and side plates 34 are received between the confronting side walls of the end posts 21 and 22, with sufficient clearance to avoid contact and unnecessary wear; and the platform side walls 35 are aligned generally in the plane of the gate side walls and move to a position adjacent to the respective end posts as best seen in FIGS. 9 and 12.

The lift platform is raised by means of a single hydraulicly actuated power cylinder 45 disposed at the left side of the lift apparatus. The upper end of this power cylinder is pivotally connected to the upper end of the left end post 21, with the cylinder being received within the end post channel and with the channel being suitably strengthened at the upper end to support the pivot pin for the power cylinder. The lower end of the power cylinder, which is the extensible piston rod 46 in the illustrated arrangement, is connected to a suitable bracket 47 rigidly connected to the lift arm 38, with its pivot point being located intermediate the ends of the lift arm.

The lifting force is transmitted to the opposite lift arm 40 by means of a torque tube 48 which extends transversely between the lift arms and is rigidly connected to the arms by means of welding, for example. In the fabrication of the assembly of the torque tube 48 and the lift arms 38 and 40, one arm is rotated relative to the other so that the arms are not in perfect alignment. In the assembled relation with reference to FIG. 4 for example, the arm 40 which lies behind the arm 38 as viewed in this figure would be rotated slightly counter-clockwise so that the rearward end, which is pivotally connected to the platform side wall 35, would be one-fourth inch higher, for example, than the corresponding rear end of the arm 38. In assembly then, and without load on the platform, the right side of the horizontal platform 30 would be approximately one-fourth inch higher than the left side.

In the design of the lift and gate apparatus, relative to the load to be supported, the structure is designed so that even with a substantial overload, the torque tube provides a safety factor which obviates any twisting of the torque tube to permit the right side of the platform to drop more than one-fourth inch relative to the left side. This built-in misalignment of the torque tube lift arm assembly provides another function, to be described subsequently.

Referring now to the foldable platform 31, this portion of the platform is an integral welded structure fabricated from a floor plate 50 which also defines a ramp at the rearward edge for rolling cargo onto the platform and suitable underfloor supporting ribs 51 in the form of angles or channels welded to the floor plate, including side ribs which lie adjacent to the side edges of the floor plate 50 and define the side walls of the gate platform. The outer side wall surfaces of the foldable platform 32 lie in the same longitudinal planes as the outer surfaces of the horizontal platform side plates 34; and the hinge joint between the horizontal platform and the foldable platform is defined, for example, by pivot studs 55 which extend outwardly from the rear edges of the side plates 34 and through bearing holes in hinge plates 56 which are welded to the foldable platform side walls at the forward ends thereof.

FIG. 6 of the drawing is a detail view of the hinged structure illustrating the relation of the horizontal platform and foldable platform in the load bearing position. In this figure a pivot stud 55 is illustrated in broken lines as being disposed at the rearward end of a horizontal platform side plate 34 for pivotally supporting the hinge plate 56. To limit the downward swing of the foldable platform 31, and maintain this platform in the horizontal plane of the horizontal platform 30, a pair of stop dogs 57 are secured as by welding to the rear edges of the respective horizontal platform side walls 35 and to the side plates 34 in a position to be engaged by the upper forward edges of the hinge plates 56 when the foldable platform is moved into the horizontal position. Further, the upper edge surfaces of the hinge plates 56 are provided with notches 58 which receive the stop dogs 57 to assist in resisting any further rotation of the gate platform under the torque load to be imposed.

The torque load of the gate platform is further born by spacer blocks 59 which may be one-fourth inch plates, for example, welded to the rearward face of the horizontal platform support rib 33a shown as a tubular member in FIG. 6. In the coacting arrangement of the platform portions, the leading edge support rib 51a for the foldable platform is positioned to be spaced from the rib 32a about one-fourth inch, in the load bearing position, to bear against the spacer blocks 59 which are particularly shown in FIG. 7. With this arrangement, a torque couple is provided between the bearing points defined by the engagement of the stop dogs 57 and notches 56 and the spacer blocks 59 which removes some of the load on the hinge pins 55. To further remove the strain from the hinge pins, the platform structures are arranged so that the horizontal platform rib 32a defines a shelf 62 which is engaged by the forward edge 63 of the foldable platform floor 50 to define a secondary hinge pivot extending along the entire length of the joint between the horizontal and foldable platform portions 30 and 31.

The lift and gate apparatus may be closed when the lift is in the upper position, as best seen in FIG. 8, by manually swinging the foldable portion 31 from the horizontal position to a forwardly inclined gate position wherein the upper edge of the gate is latched under tension to the upper end of the left end post 21 as will now be described. As best seen in FIG. 8, when the lift apparatus is in the upper position, the horizontal platform portion 30 lies generally in the plane of the bed floor 11 and defines a rearward extension thereof. Side walls for this rear extension are defined by the end posts of the lift frame and also by side walls 35 of the horizontal platform portion. The foldable gate portion is angled forwardly so that its effective height is the same as that of the side walls 13 of the truck. This height may be, for example, 19 inches above the bed floor 11. With this arrangement, the rear view by operator is no more obstructed than it would be with the truck not equipped with the lift and gate apparatus; even though the depth of the platform gate portion may be substantially greater than 19 inches.

The latching of the gate portion under tension is accomplished as a result of the above described arrangement of the lift power cylinder and torque tube. In accordance with the design and installation of the lift and gate apparatus, the limit of upward travel of the horizontal platform 30 on the power side, that is at the lift arm 38, will be established by the mounting and adjustment of the power cylinder. This would provide for the positioning of the horizontal platform floor 32 in the same plane as the bed floor 11 at the left or power side of the lift apparatus. As previously described, the righthand side of the lift apparatus, under no load conditions, will be slightly higher than the left side due to the designed arrangement of the torque tube and lift arm assembly. Accordingly, when the lift is raised under no load conditions, the right side of the horizontal platform portion will reach the plane of the bed floor 11 ahead of the left side of the platform.

Referring to FIG. 9, which is a sectional view through a longitudinal vertical plane, adjacent to the right side end post 22, a stop block 64 is welded to the side wall of the end post 22 to be engaged by the right forward corner of the horizontal platform floor as the platform 30 approaches its upper limiting position. As seen in FIG. 9, this stop block stops further upward movement of the right side of the platform when the floor 32 is aligned in the plane of the bed floor 11. Because the right side of the platform is leading the left side, assuming no load or normal load conditions, the continued elevation of the left side of the platform to its limiting position by the power cylinder will necessarily result in a twisting of the torque tube 48 to place a torsional stress in the tube. In this condition, the horizontal platform portion 30 is aligned with the bed floor 11; and the gate portion 31 may then be swung as indicated in FIG. 8 to the latching position.

As best seen in FIGS. 3, 10, and 12, the gate platform 31 is provided with a latching dog 65 which projects laterally from the rear left corner of the platform to be received in an upward opening latching recess 66 provided at the upper end of the inner side wall of the left end post 21. FIG. 10 illustrates two positions of the gate platform 31 as it is swung to the latching position wherein the latching dogs 65 overlies the latching recess 66 and clears the rearward lip of the recess 66. This clearance is effected by the fact that lifting force continues to be applied through the power cylinder holding the left side of the platform in the upper limiting position. FIG. 11 of the drawing illustrates the condition where the power unit for the power cylinder is shut off to remove the lifting force at the power cylinder. With this force removed, the stressed torque tube 48 rotates the lift arm 38 counter-clockwise, as viewed in FIG. 8, relative to the lift arm 40 tending to move the left side of the platform downward which pulls the left side of the gate portion 31 downward into the locked position illustrated in FIG. 11. This locks the gate 31 in the closed position, with the gate being maintained in this locked position under the tension of the torque tube.

As seen in the drawings, this latching engagement of the gate platform 31 and the frame end post 21 is the only mechanical contact between the gate and the remainder of the assembly, other than the hinge connection with the horizontal platform portion 30. Clearance is provided between the foldable platform 31 and the right side end post 22 and also between the gate and the left side end post so that rattles are eliminated and wear due to rubbing or contacting parts is obviated.

To open the gate, it is necessary to energize the power unit control to the lift position to again stress the torque tube and lift the latching dog 65 to the position shown in FIG. 10 wherein the gate 31 may be manually swung to the horizontal position. In an emergency situation, should there be a failure of the power cylinder or power unit, the latching dog may be released from the latch recess through the use of some form of prying tool.

Figure 1:
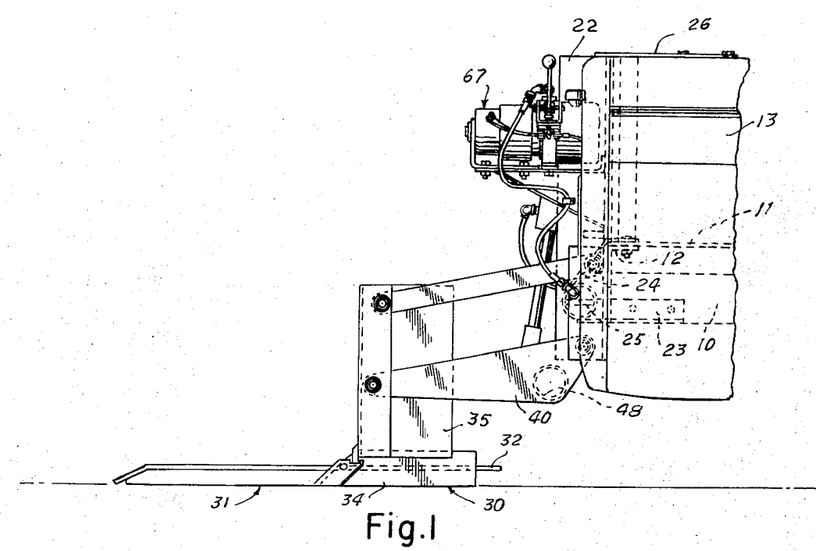
FIG. 1 is a fragmentary right rear side view of a pick-up truck showing the lift platform at the ground position and particularly showing the hydraulic controls unit.

As best seen in FIGS. 1, 2, and 3, the power and control unit 67 for the apparatus is conveniently mounted on the right end post 22 by means of a shelf and bracket assembly 68 which may be conveniently welded to the end post. The power and control unit may consist of the usual components including hydraulic pump and electric drive motor, hydraulic reservoir and operating control valve. The hydraulic conduit 69 extending between the power unit on the right side and the power cylinder on the left side may be passed conveniently through the tubular base member 20 of the lift frame.

OPERATION

Figure 7:
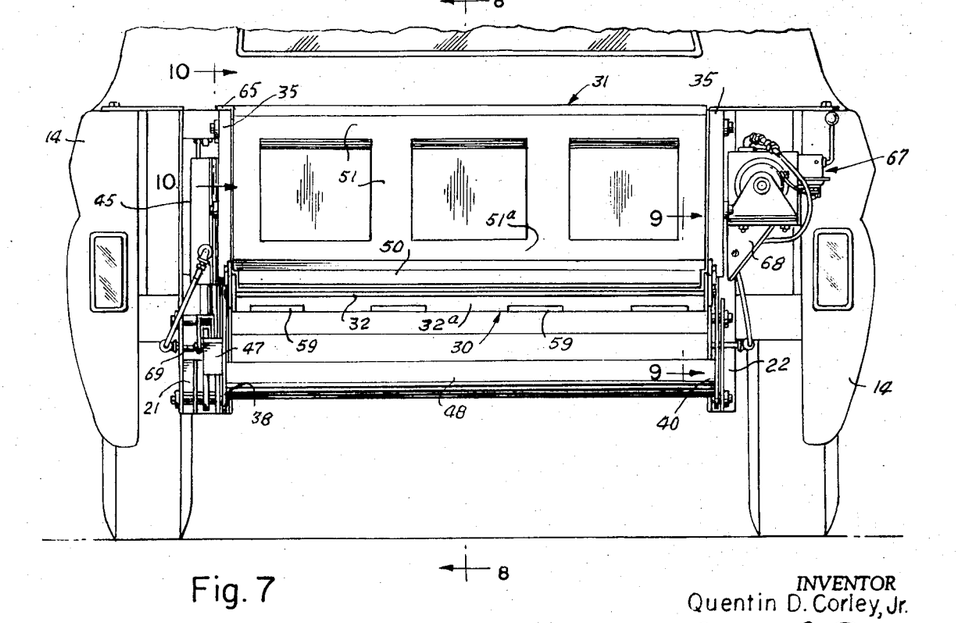
FIG. 7 is a fragmentary elevation view of the pick-up truck with the lift apparatus in the raised position with the gate closed.

The operation of the lift and gate apparatus will now be described assuming a truck unloading operation and beginning with the gate in the latched position as illustrated in FIG. 7 and 8.

To permit unlatching of the gate 31, the control lever of the power unit 67 is actuated to the "raise" position, thereby directing pressurized fluid to the power cylinder to raise the left side of the platform and release the latching dog 65. The gate is then manually swung to the horizontal position in the plane of the horizontal platform 30 and of the bed floor 11.

The cargo to be unloaded may then be shifted from the floor 11 to the lift platform; and the power unit control is then shifted to the "lower" position permitting the platform 30, and 31 to swing downward to the rest position at ground level as illustrated in FIGS. 1 and 2, for example.

Following unloading of the cargo, the power unit control lever is again shifted to the "raise" position to effect raising of the apparatus by the power cylinder. The right side of the horizontal platform portion 30 first engages the stop 64 on the end post 22; and the power cylinder raises the left side of the platform an additional anglement to impart a torsional stress to the torque tube 48. The gate 31 is then manually swung upward and inward to its closed position to align the latching dog 65 with the latching recess 66. The power unit control lever is then shifted to the "lower" position to release the left force on the power cylinder and permit the torque tube to rotate the left side of the platform back to lock the latching dog 65 under tension as illustrated in FIG. 11.

What has been described is an improved lift and gate apparatus which is particularly adapted for use with a pick-up type truck having either a wide side or a narrow side body. The apparatus is convenient and safe to use, is durable to provide long and useful service, and is neat and clean in appearance so that it looks good on the truck.

An important feature of the apparatus is the frame construction providing for mounting of the unit on both the frame and bed of the truck to provide a rigidly mounted lift apparatus which will adequately support the torque load placed on it without distortion of frame or body members of the pick-up truck.

Another important feature of the invention is the provision of a single power cylinder for operating the lift apparatus, with the power cylinder being mounted at one side and a torque tube being provided to balance the lifting forces applied to the lift platform.

Still another important feature of the invention is the gate latching arrangement whereby the gate platform portion is positively latched in the closed position under tension provided by the torque tube provided for the lifting function. This arrangement serves to eliminate rattles and unnecessary wear of the parts of the lift and gate apparatus.

A further feature of the invention is the provision of the two part folding platform which serves to extend the bed surface of the truck, and wherein the foldable portion of the platform is deep to provide a deeper platform then is usually available with accompanying increase of surface area, and which is foldable to the normal gate height so as not to obstruct rear vision.

Still another feature of the invention is the improved hinge arrangement for the folding platform for bearing the torque load imposed on the folding or gate portion.

While the preferred embodiment of the invention has been illustrated and described, it will be understood by those skilled in the art that changes and modifications may be resorted to without departing from the spirit and the scope of the invention.

What is claimed is:

1. For use with the vehicle having a load carrying bed supported on a frame, a lift and gate apparatus comprising:
   a unitary frame including a horizontal base and upright end posts; said horizontal base having means for attachment to the vehicle frame;
   a lift platform; pairs of parallel arms pivotally attached to each side of said platform and to a respective frame end post, said arm pairs defining swingable parallelogram supports for maintaining said platform in horizontal planes;
   each pair of arms including a lift arm and a guide arm; a torsion member extending between said lift arms and coupling said lift arms for substantially simultaneous rotation; and extensible power cylinder means pivotally connected between one of said end posts and the associated lift arm, on only one side of said platform to swing said lift arm relative to said end post and, via said torsion member, to swing the other said lift arm relative to its end post.

2. The lift and gate apparatus as set forth in claim 1:
   wherein said horizontal base comprises a lower tubular member having transversely extending brackets for attachment to the vehicle frame, and an upper mounting flange welded to the tubular member and adapted for attachment along its length to an edge of the vehicle bed.

3. A lift and gate apparatus as set forth in claim 1:
   wherein said horizontal base is a member of substantial depth having means adjacent to its lower edge for attachment to the vehicle frames, and having means adjacent to its upper edge for attachment to an edge of the vehicle bed.

4. A lift and gate apparatus as set forth in claim 1:
   wherein said lift platform includes an inner horizontal platform portion and an outer foldable platform portion hinged to said horizontal platform; and wherein said lift arms are pivotally attached to said horizontal platform.

5. A lift and gate apparatus as set forth in claim 1:
   wherein said horizontal base comprises a tubular member having transverse brackets for attachment to the vehicle frame;
   wherein said end posts each comprise an elongated member having at least two adjacent angled walls, defining a side wall and a wall transverse thereto;
   wherein said tubular member is secured to said end post side walls by welded joints;
   and wherein said joints include strengthening plates extending into said tubular member and being welded thereto and extending through openings in the facing side walls of the respective end posts and being welded to the respective transverse walls of said end posts.

6. A lift and gate apparatus as set forth in claim 1:
   wherein said horizontal platform includes side walls members;
   said horizontal platform being movable to an upper limiting position wherein the platform floor lies in the plane of the vehicle bed floor, and wherein said platform side walls define, with said end posts, a gate opening;
   and wherein said foldable platform is dimensioned to be received within said gate opening to define a gate therefor.

7. A lift and gate apparatus as set forth in claim 6:
   including coacting latch means disposed adjacent to the upper end of one of said posts and adjacent to the outer edge of said foldable platform;
   and said foldable platform being swingable inwardly at an acute angle relative to said horizontal platform to engage said latch means.

8. A lift and gate apparatus as set forth in claim 6:
   including stop means mounted on the end post opposite from the power cylinder and engageable by the side of the horizontal platform remote from the power cylinder for limiting the upward movement of the remote side of the platform prior to attainment of the travel limit of the power cylinder;
   said horizontal platform being supported by said lift arms and interconnected torsion member in a manner that the remote side reaches the plane of the vehicle bed slightly ahead of the side proximate to said power cylinder; and said power cylinder continuing to lift said proximate side a limited predetermined distance to place a torsional stress in said torque bar;
   coacting latch means for said foldable platform comprising a dog extending laterally from the distal edge thereof and an upward opening recess in the power cylinder end post engageable by said dog;
   said foldable platform being swingable to the gate closing position with said dog being movable into said latch recess, when the proximate side of the horizontal platform is lifted to stress said torsion member;

and said dog being drawn downwardly into locking relation with said latch recess by said torsion member when the lifting force of said power cylinder is released.

9. A lift and gate apparatus as set forth in claim 4;

wherein said horizontal platform includes opposed laterally projecting hinge pins adjacent to its rearward edge defining a hinge axis, and wherein said foldable platform includes forwardly projecting hinge brackets for coacting pivotal engagement with respective hinge pins; stop means mounted on said horizontal platform in position to be engaged by said hinge brackets to define load bearing points spaced from the hinge axis to limit downward swinging movement of the foldable platform to the plane of said horizontal platform.

10. A lift and gate apparatus as set forth in claim 9:

wherein said horizontal platform rearward edge and said foldable platform forward edge have coacting means defining a support axis adjacent to said hinge axis.

11. A lift and gate apparatus as set forth in claim 9:

including coacting bearing means acting between said horizontal and foldable platforms defining load bearing points along a line parallel to and spaced from the hinge axis, said load bearing means being operative at the limit of downward swinging movement of the foldable platform;

and said second named load bearing points and said first named load bearing points being spaced from the hinge axis on opposite sides to define a torque couple operative about the hinge axis.

12. In combination:

a truck having a load carrying bed, supported on longitudinal frame members, and side walls means defining a rear gate opening for the bed;

a lift and gate apparatus for the truck including a unitary frame comprising a horizontal base and upright end posts; said horizontal base including an elongated member having spaced bracket means for rigidly anchoring said frame to said vehicle longitudinal frame members, and having elongated flange means for rigidly anchoring said frame to the rearward edge of said vehicle bed;

means connecting said frame end posts to said vehicle side walls to define therewith a gate opening for the vehicle bed;

a lift platform; pairs of parallel arms pivotally attached to each end of said platform and to a respective frame end post, said arm pairs defining swingable parallelogram supports for maintaining said lift platform in horizontal planes;

each pair of arms including a lift arm and guide arm; a torsion member extending between said lift arms and coupling said lift arms for substantially simultaneous rotation; and extensible power cylinder means pivotally connected between only one of said end posts and the associated lift arm to swing both said lift arms relative to said frame.

* * * * *